US005577048A

United States Patent [19]

Kasa

[11] Patent Number: 5,577,048
[45] Date of Patent: Nov. 19, 1996

[54] METHOD OF DETECTING PTY BURST SIGNAL

[75] Inventor: Koichi Kasa, Kawagoe, Japan

[73] Assignee: Pioneer Electronic Corporation, Tokyo, Japan

[21] Appl. No.: 479,183

[22] Filed: Jun. 7, 1995

[30] Foreign Application Priority Data

Jun. 8, 1994 [JP] Japan .................................... 6-126092

[51] Int. Cl.$^{6}$ ........................................ H04Q 7/06

[52] U.S. Cl. ........................................ 370/110.1; 455/228

[58] Field of Search ............................ 455/151.1, 151.2, 455/152.1, 227, 228; 340/825.44, 825.48; 370/110.1, 110.3; 375/340, 267, 347; 371/69.1; 364/740

[56] References Cited

U.S. PATENT DOCUMENTS

| | | | |
|---|---|---|---|
| 4,633,517 | 12/1986 | Pfeifer | 455/228 |
| 5,020,143 | 5/1991 | Duckeck et al. | 455/228 |
| 5,095,532 | 3/1992 | Mardus | 455/228 |
| 5,289,391 | 2/1994 | Ibrahim et al. | 375/340 |

*Primary Examiner*—Benedict V. Safourek
*Attorney, Agent, or Firm*—Perman & Green

[57] ABSTRACT

A program type code (PTY) burst signal detection method for a radio data system (RDS) receiver, which can automatically receive an arbitrary information program from another network from the beginning of the program. This detection method detects a PTY burst signal in RDS data, which is indicative of switching of broadcasting of an information program from another network. The PTY burst signal is defined as a signal obtained by transmitting RDS data of a group type 14A comprising an information classification code (Usage Code)=(13) in a second block several times in a short period of time. This detection method respectively compares data of three blocks at least in the 14A group, excluding the first block thereof, with data of the three blocks received earlier, and detects the PTY burst signal when every compared data matches with associated data by a predetermined number of times.

5 Claims, 16 Drawing Sheets

14A GROUP

14B GROUP

METHOD OF DETECTING PTY BURST SIGNAL

BACKGROUND OF THE INVENTION

1. Field of the Invention

The present invention relates to a method of detecting a PTY burst signal in an RDS receiver, which can automatically receive an arbitrary information program from another network from the beginning of its broadcasting.

2. Description of Background Information

An RDS (Radio Data System) is an FM multiplexed broadcasting system recommended by the CCIR (International Radio Consultative Committee). The RDS provides mainly car radios with various services, such as displaying the name of the broadcasting station, automatic tuning and automatic reception of a traffic information program.

Conventionally, the automatic reception function of an RDS receiver could not receive other than the traffic information of a receiving station previously set in the receiver and its associated station, i.e., the traffic information of stations in a local network. When no traffic information program is broadcasted in this network, therefore, the user cannot get any traffic information all the time.

To solve such a problem, the present applicant has filed a patent application about a traffic information receiving method which can automatically receive traffic information programs of other network stations by an interruption reception (see Japanese Patent Application No. Hei 4-213910). This traffic information receiving method utilizes newly established EON (Enhanced Other Networks) information consisting of 14A and 14B groups to detect that the broadcasting of a traffic information program from another network station has started, and automatically switch the receiving station of the RDS receiver from a previously set this network station to a station in another network to receive traffic information which is currently broadcasted from another network station, by an interruption reception.

This prior art system merely receives traffic information broadcasted from another network station, but cannot receive any other information programs than the traffic information. In receiving an arbitrary information program, it is desirable to start receiving such information program from the beginning. The conventional RDS receivers including the aforementioned prior art system of the present applicant could not accomplish such time-synchronous reception.

SUMMARY OF THE INVENTION

Accordingly, it is a primary objective of the present invention to provide a PTY burst signal detection method for use in an RDS receiver which can automatically receive an arbitrary information program from another network from the beginning of its broadcasting.

To achieve this object, according to the first aspect of this invention, there is provided a PTY burst signal detection method for use in an RDS receiver in an RDS system for transmitting same EON information of a group type 14A comprising an information classification code (Usage Code)=(13) in a second block several times in a short period of time and defining a resultant signal as a PTY burst signal indicative of switching of broadcasting of an information program from another network, which method respectively compares data of three blocks at least in the 14A group, excluding a first block thereof, with data of the three blocks received earlier, and detects a PTY burst signal when every compared data matches with associated data by a predetermined number of times.

RDS data consists of 16 groups, group 0 to group 15, including undefined groups. Recently, 14A and 14B groups belonging to the undefined groups of this RDS data have been defined newly for EON information as shown in FIGS. 1A and 1B. This EON information permits the transmission of not only information of a currently receiving local or this network but also information of other non-receiving networks. This invention is designed to utilize data defined by the information classification code (Usage Code)=(13) in the newly defined 14A group.

According to the second aspect of this invention, the above-described detection method detects a PTY burst signal when three blocks of data all match with associated, compared three blocks of data consecutively by a predetermined number of times.

According to the third aspect of this invention, the detection method of the first aspect detects a PTY burst signal when three blocks of data all match with associated, compared three blocks of data by a predetermined number of times in a predetermined period of time.

According to in the fourth aspect of this invention, the detection method of the first aspect separates three blocks to be compared to a pair of the second block and third block and a pair of the second block and fourth block, performs data comparison for each block pair, and detects a PTY burst signal when each block pair of data matches with an associated, compared block pair of data consecutively by a predetermined number of times.

According to the fifth aspect of this invention, the detection method of the first aspect separates three blocks to be compared to a pair of the second block and third block and a pair of the second block and fourth block, performs data comparison for each block pair, and detects a PTY burst signal when each block pair of data matches with an associated, compared block pair of data by a predetermined number of times in a predetermined period of time.

DETAILED DESCRIPTION OF THE PREFERRED EMBODIMENTS

Figure 1A:
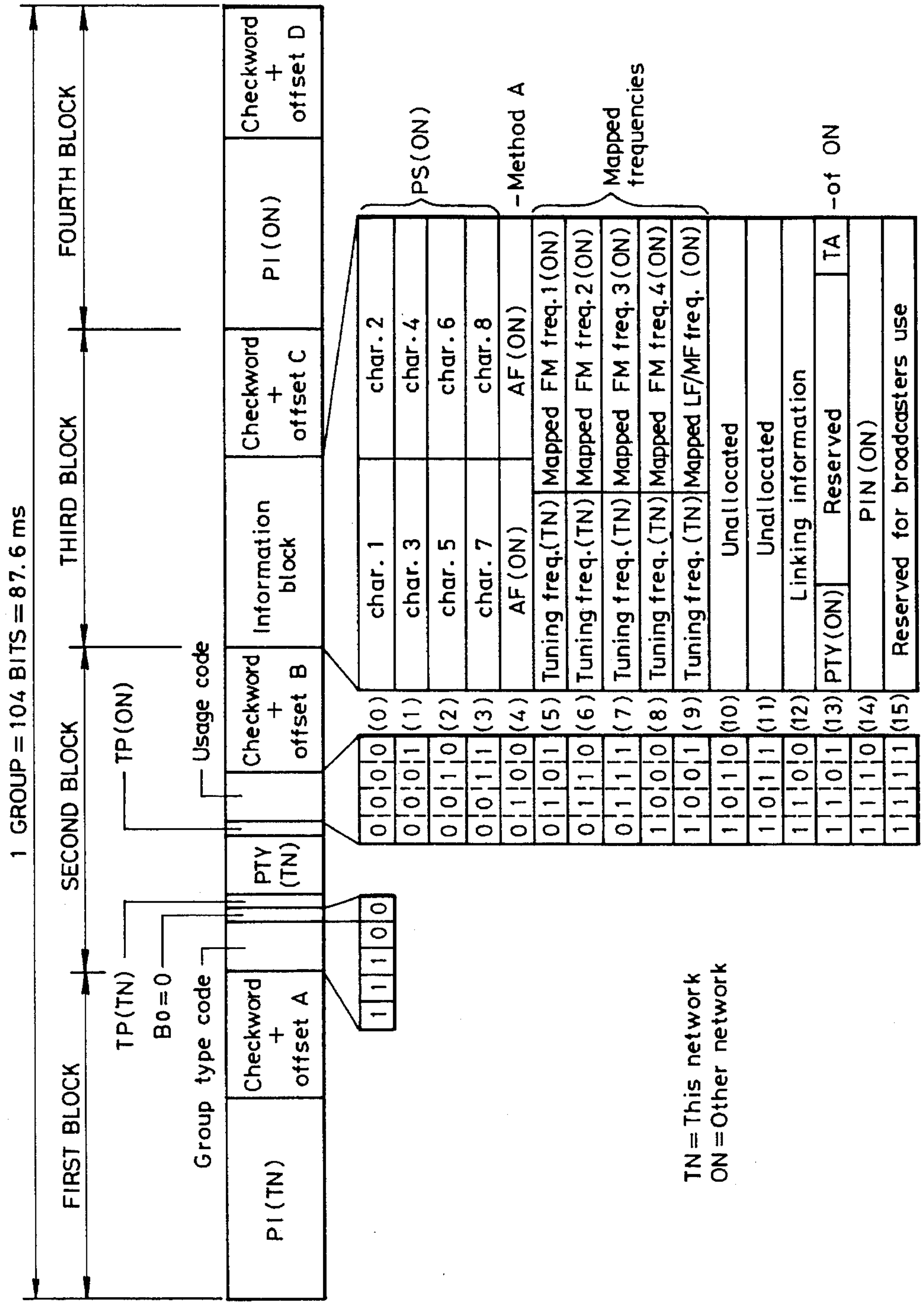
FIGS. 1A and 1B are diagrams showing the data formats of EON information.
Figure 1B:
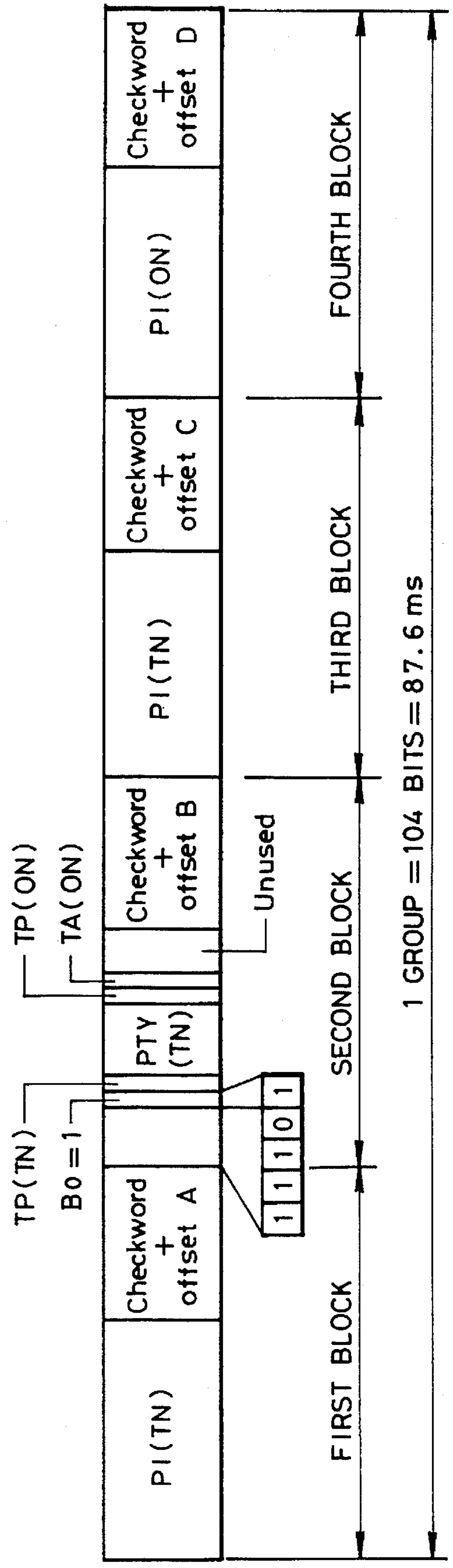

Before entering into the description of preferred embodiments of the present invention, the data formats of EON information in FIGS. 1A and 1B, on which this invention is premised, will be discussed first. In FIGS. 1A and 1B, "(TN)" affixed to the end of each code indicates that it is data of a local network (This Network), and "(ON)" likewise indicates that it is data of other networks (Other Network).

In the 14A group in FIG. 1A, a program identification (ID) code PI(TN) of this network is given in the first block. This PI(TN) code consists of a country code (4 bits), a broadcasting area cod& (4 bits), and a program reference number code (8 bite), a total of 16 bits. An RDS receiver searches this PI(TN) code for any other station with the same code. That is, this PI(TN) code serves to allow the user to continuously listen to the same program from another network station having the same code even while the user is driving outside the service area of this network.

The second block in the 14A group includes a group type code (Group type code), a version bit B0, a traffic program station code TP(TN), a program type code PTY(TN), a traffic program station code TP(ON) and an information classification code (Usage code).

The group type code (Group type code) is a 4-bit code to identify what data follows this code, and specifies 16 groups 0 to 15 using four bits. The subsequent version bit B0 (1 bit) specifies either the version A or B. B0 =0 indicates the A version and B0 =1 indicates the B version. Therefore, the group type code in the 14A group is given by "11100" as shown in FIG. 1A and the group type code in the 14B group is given by "11101" as shown in FIG. 1B.

The traffic program station code TP(TN) is a 1-bit code indicating if a traffic program station is presently located in this network. The program type code PTY(TN) is a 5-bit code to identify 32 types of program types 0 to 31 (music program, news program, sports program, etc.). Program types are assigned based on previously determined regulations.

The traffic program station code TP(ON) is a 1-bit code indicating if a traffic program station is presently located in other networks. By always monitoring this TP(ON) code, it is possible to find out in real time if there is a traffic program station presently in other networks.

The information classification code (Usage code) is a 4-bit code indicating the type of information sent in the next third block. As shown in FIG. 1A, 16 types of information (0) to (15) are defined by using 4-bit codes "0000" to "1111 ".

The character codes of the names of broadcasting stations (char.1 to char.8) are described in areas (0) to (3) in the third block. The broadcasting frequency data AF(ON) of other networks is described in a method A format in an area (4) in the third block, and the broadcasting frequency data (Tuning freg.(TN)) of this network and the broadcasting frequency data (Mapped FM freq (ON)) of other networks are described in a mapped frequencies format in areas (5) to (9). The format of the broadcasting frequency data in the area (4) or the areas (5) to (9) is previously selected by each broadcasting station, so that broadcasting frequency data is transmitted in the selected format.

Areas (10) and (11) are undefined, an area (12) is for linking information, an area (13) includes program type code PTY(ON) and traffic announce code TA, and an area (14) includes a program initiation number PIN(ON) for other networks. An area (15) is a data area reserved for a broadcasting station. The fourth block includes a program ID code PI(ON) for other networks. By monitoring the program type code PTY(ON) of other networks in the area (13), therefore, it is possible to receive an arbitrary information program from another network.

In the 14B group in FIG. 1B, a program identification (ID) code PI(TN) of this network is given in the first block. The second block in the 14B group includes a group type code "11101" indicating the 14B group, a traffic program station code TP(TN), a program type code PTY(TN), a traffic program station code TP(ON) and a traffic announce code TA(ON). By monitoring the traffic announce code TA(ON) of other networks, therefore, it is possible to find out in which station in other networks the traffic information is broadcasted.

The third block in the 14B group includes a program ID code PI (TN) of this network, and the fourth block includes a program ID code PI (ON) for other networks.

By monitoring the program type code PTY(ON) in the transmitted data of the information classification code (Usage code)=(13) in the 14A group, as mentioned earlier, it is possible to receive an arbitrary information program from another network.

In receiving an arbitrary information program, it is desirable to receive such information program from the beginning of its broadcasting. To receive an arbitrary information program from the beginning of its broadcasting, it is necessary to transmit the broadcasting start time somehow.

Figure 2A:
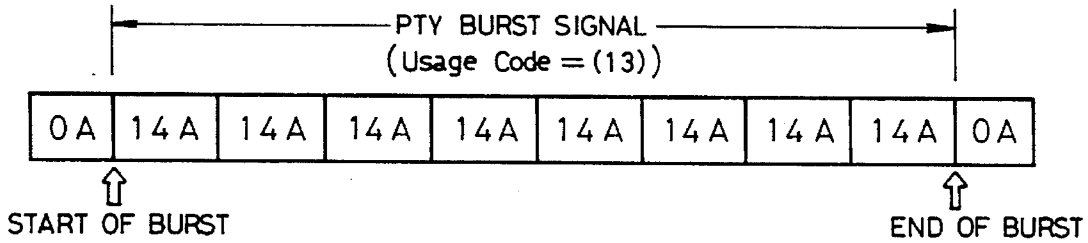
FIGS. 2A and 2B are diagram showing a transmission format of a PTY burst signal.
Figure 2B:
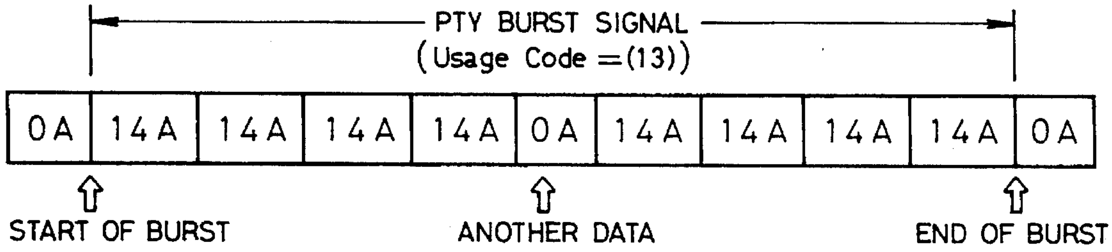

In this invention, therefore, it is assumed that the same RDS data of a group type 14A comprising the information classification code (Usage Code)=(13) in the second block is consecutively transmitted a predetermined number of times in a short period of time, as exemplified in FIGS. 2A and 2B. FIG. 2A shows an example where the 14A group comprising the information classification code (Usage Code)=(13) is consecutively transmitted eight times, and FIG. 2B shows an example where the 14A group comprising the information classification code (Usage Code)=(13) is consecutively transmitted eight times with data of another different group type inserted in-between.

In this invention, a set of the 14A groups appearing consecutively by a predetermined number of times is called "PTY burst signal". As the length of one group is 87.6 millisecond (see FIG. 1A), the PTY burst signal in FIG. 2A has a length of 700.8 millisecond and the PTY burst signal in FIG. 2B has a length of 788.4 millisecond.

Normally, when the reception of RDS data is in a good condition, the PTY burst signal in FIG. 2A or FIG. 2B can be received completely error free, and it is possible to detect if this signal is the PTY burst signal indicating the beginning of the broadcasting of an information program from another network by counting the number of the 14A groups.

Some RDS receivers, like the one installed on a vehicle, may not be able to completely receive the PTY burst signal due to the multi-path influence depending on the driving environment. In such a case, although the PTY burst signal is transmitted, the beginning of the broadcasting cannot be detected, disabling the reception of the program from its beginning. The present invention has been developed to present a PTY burst signal detection method which can receive an information program from the beginning even under such a poor reception condition.

In consideration of the case where the PTY burst signal may not be received completely, the detection method of the present invention respectively compares data of three blocks in one 14A group, excluding the first block thereof, i.e., data of the second, third and fourth blocks in FIG. 1A, with data of the same three blocks in 14A groups received earlier, and detects the PTY burst signal when every compared data matches with associated data by a predetermined number of times.

With the use of this detection method, even when the PTY burst signal cannot be received completely, the presence of the PTY burst signal can be detected, permitting the RDS receiver to receive an arbitrary information program from another network from the beginning of the program.

In the detection method of this invention, the first block in the 14A group is not used and only three blocks, the second, third and fourth blocks in the 14A group are used. This is because as apparent from the data format in FIG. 1A, the first block in the 14A group contains data of the program ID code PI(TN) of the currently receiving local network, which is not directly associated with another network whose broadcasting program is to be received.

Figure 3:
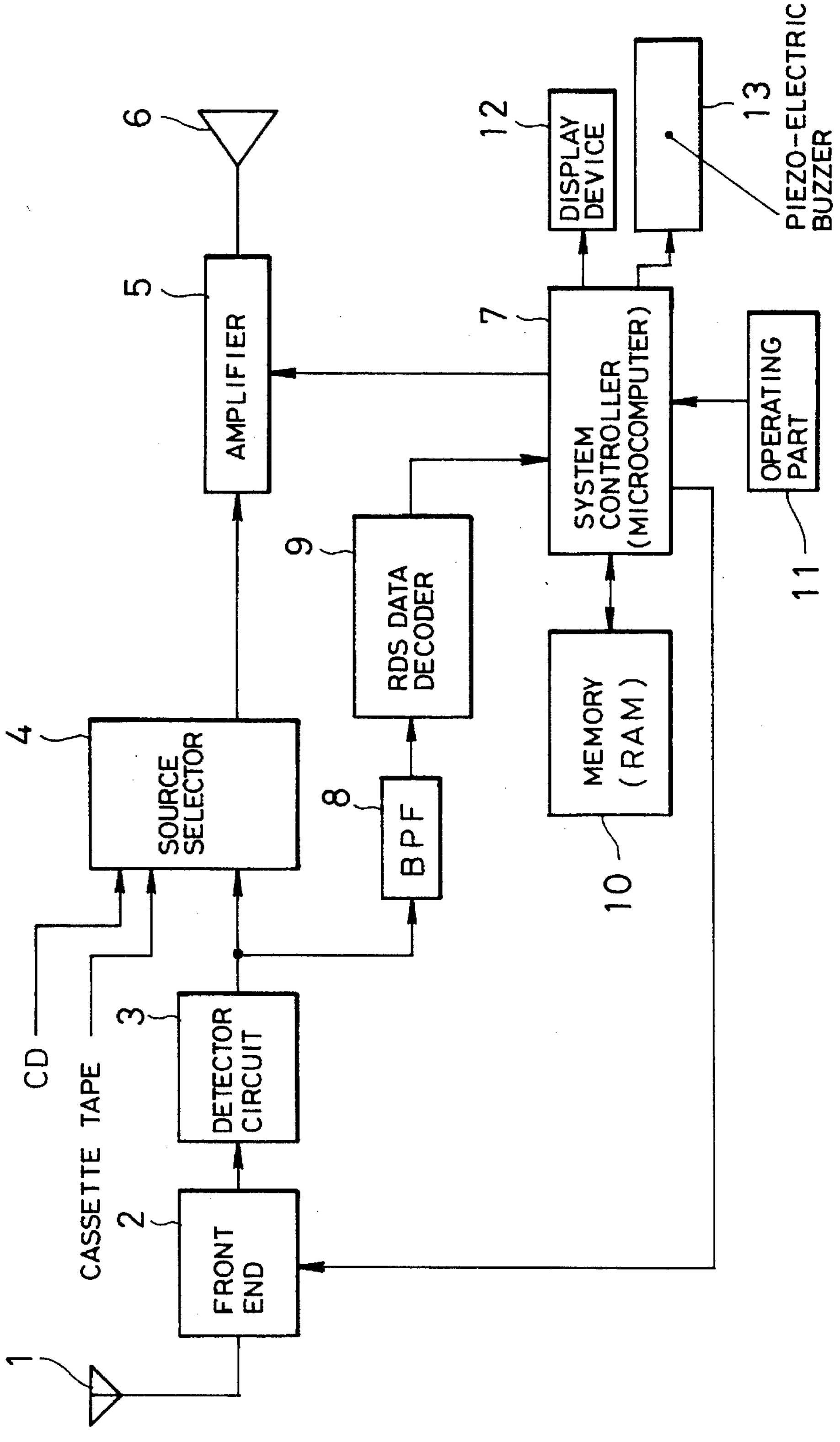
FIG. 3 is a block diagram of an RDS receiver in which a detection method according the present invention is performed.

FIG. 3 is a block diagram of an RDS receiver in which a detection method according to the present invention can suitably be performed.

In the figure, the part denoted by the reference numerals 1 through 6 is a so-called superheterodyne receiver for the FM reception, or the AM/PM reception. The reference numeral 1 denotes an antenna, 2 denotes a front end, 3 denotes a detector circuit, 4 denotes a source selector, 5 denotes an amplifier, and 5 denotes a speaker. The front end 2 is controlled by a system controller 7 so that the oscillation frequency of a PLL circuit (not illustrated) provided therein is variably controlled, thereby it is tuned at a station of which the reception is desired. The system controller 7 comprises a microcomputer or the like for performing processing operations according to the present invention, and controls the operation of the whole system.

The numeral 8 denotes a band-pass filter (BPF) having a center frequency of 57 KHz for extracting the RDS signal only from an output signal of the detector circuit 3. The numeral 9 denotes an RDS data demodulator for demodulating the RDS signal fed from the BPF 8 into original data. The numeral 10 denotes a memory (RAM) for storing the decoded RDS data, and the numeral 11 denotes an operating part, 12 denotes a display device consisting, for example, of a liquid crystal display, and the numeral 13 denotes an alarm device consisting, for example, of a piezo-electric buzzer.

Figure 4:
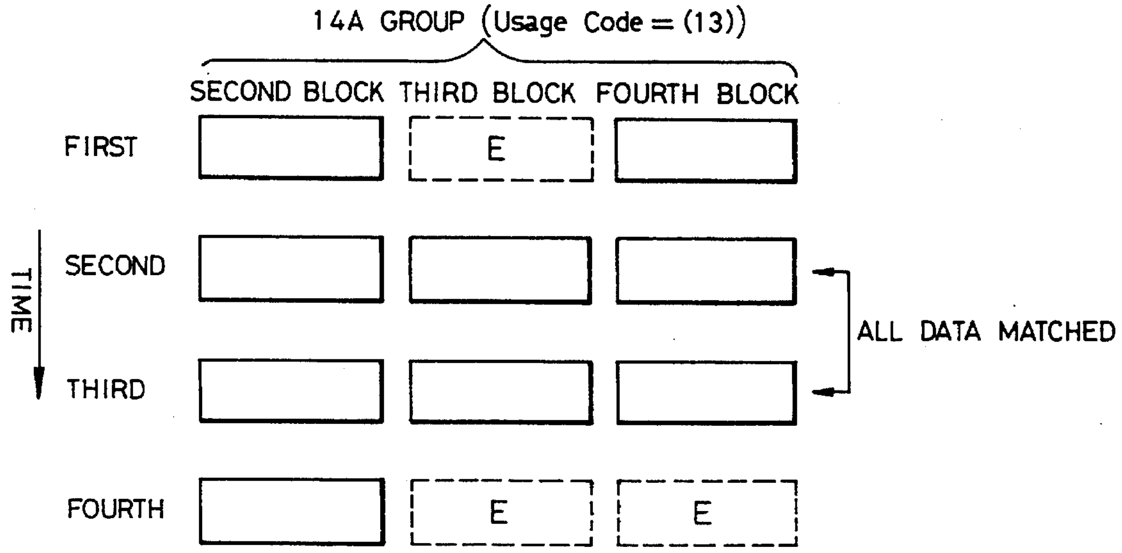
FIG. 4 is a diagram illustrating a detection method according to a first embodiment of this invention.

FIG. 4 shows a detection method according to a first embodiment of this invention.

In the first embodiment, when the three blocks, namely the second, third and fourth blocks in each 14A group sent as a PTY burst signal all match with those transmitted earlier consecutively at least once, this signal is detected as the proper PTY burst signal.

In FIG. 4, data in individual 14A groups constituting a PTY burst signal are arranged in the vertical direction group by group for easier understanding of the following description; the vertical direction represents the passage of the reception time. Only the second, third and fourth blocks are illustrated as the data of a 14A group and the first block which does not directly relate to this invention is omitted from the drawing. Broken-lined blocks marked "E" are blocks which have caused a reception error.

The operation of the system controller in the first embodiment will be explained with reference to the flowchart of FIG. 5. In the operational steps depicted in FIG. 4, the system controller 7 Judges, at step S101, as to whether or not the data acquired is the data of 14A group (usage 13). In the answer is Yes in step S101, the program proceeds to step S102 in which it is judged whether or not data error exists.

If it is detected in step S101 that no data error exists, the system controller 7 compares the acquired data with data stored in a comparison buffer provided in the memory 8 for each of the second, third, and fourth blocks, at step S103. For this comparison, the comparison buffer has a memory capacity for storing the data of three blocks (the second through fourth blocks). If the comparison at step S103 is resulted that the acquired data (input data) coincides with the data held in the comparison buffer for all of the second through fourth blocks, it is determined at step S106 that a PTY burst has been detected. If, on the other hand, the comparison at step S103 is resulted that the acquired data does not coincide with the data held in the comparison buffer, the contents of the comparison buffer is renewed by the acquired data (input data) at step S105. If it is detected in step S101 that the acquired data is not the 14A data, the program proceeds to step S104 in which the contents of the comparison buffer is cleared (or, reset to zero). After the steps 8104 and S105, the program returns to START.

An example of operation according to the flowchart of FIG. 5 will be explained with reference to FIG. 4 Suppose that only the second and fourth blocks of the first 14A group Constituting a PTY burst signal have been received correctly, and the second, third and fourth blocks of the second 14A group have all been received correctly, as illustrated.

In this case, the first acquired 14A group includes a error in the third block, and the answer is Yes in step S102. Therefore, the contents of the comparison buffer is cleared at step S104, and subsequently the program returns to START. Subsequently, when the second 14A group is acquired (step S101), the answer is No at step S102 and the program proceeds to step S103. In this instance, the contents of the comparison buffer has been cleared, so that the answer of step S103 is No. Therefore, the comparison buffer is renewed by the data of the second 14A group at step S105, and the program returns to START.

When the third 14A group is acquired, the answer at step S102 is No, and the program proceeds to step S103. Since the contents of the comparison buffer has been renewed by the data of the second 14A group, and the answer of step S103 is Yes. Therefore, it is then Judged at step S106 that a PTY burst has been detected. FIG. 6 shows a flowchart of a case that the detection of the coincidence between the acquired 14A data and the data held in the comparison buffer for more than twice is required in order to judge that a PTY burst has been detected. As illustrated in this figure, the program steps S101 through S105 are identical with those shown in FIG. 5, and the explanation thereof will not be repeated. After step S103, if the answer at step S103 is Yes, then the program proceeds to step S107 in which a count value C of a counter, whose initial value has been set to zero, is incremented by one. Then, the program proceeds to step S108 in which the count value is compared with a predetermined value n. If in step S108 that the count value has reached the value n, then at step S109 it is determined that a PTY burst has been detected.

By arbitrarily determining the value n, a required number of times for the detection of the coincidence between the acquired data and the data held in the comparison buffer at step S103 can be set.

Then a modification of a first embodiment in which the detection of data error at step S102 is omitted will be described.

In this modification of the first embodiment, it is assumed that only the second and fourth blocks of the first 14A group constituting a PTY burst signal have been received correctly, and the second, third and fourth blocks of the second 14A group have all been received correctly, as illustrated in FIG. 4.

Then, comparison is performed between the first and second 14A groups to determine if the data of the second, third and fourth blocks of the first 14A group respectively match with the data of those of the second 14A group. In this case, because the third block in the first 14A group is in a reception error, no data match occurs in the third block. Next, data of the third 14A group is received; it is assumed that the second, third and fourth blocks of this 14A group have all been received correctly.

Similarly, comparison is performed between the second and third 14A groups in the previous comparison to determine if the data of the second, third and fourth blocks of the second 14A group respectively match with the data of those of the third 14A group. In the case of FIG. 4, since the data of the second, third and fourth blocks of the second and third 14A groups perfectly match with each other, the signal is detected as a PTY burst signal when this coincidence occurs.

In the case where an information program represented by the program type code (PTY(ON)) in the third block in the current 14A group matches with an information program of another network which has previously been set in the RDS receiver and whose reception is desired, when the information program from this another network is picked up upon the generation of a signal indicative of the detection of the PTY burst signal, this information program can be automatically received from the beginning.

Although the received signal is detected as the PTY burst signal when all of the second, third and fourth blocks match with those received earlier consecutively at least once in the first embodiment, as mentioned above, the number of consecutive coincidences may be set, for example, to two times or more, three times or more, or any other number as well.

Figure 7:
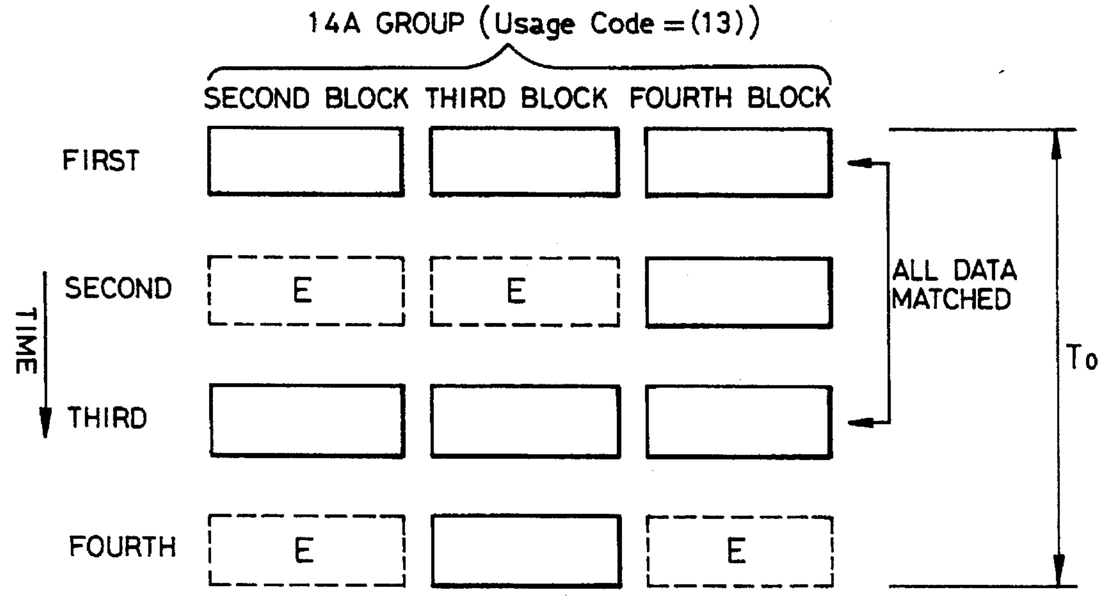
FIG. 7 is a diagram illustrating a detection method according to a second embodiment of this invention.

FIG. 7 shows a detection method according to a second embodiment of this invention.

In the second embodiment, when the three blocks, namely the second, third and fourth blocks in each 14A group sent as a PTY burst signal all match with those transmitted earlier at least once within a previously set time $T_0$, this signal is detected as the proper PTY burst signal. Assuming that the second, third and fourth blocks in the first 14A group have all been received correctly, then a timer is started from a set time $T_0$ and during the passage of this time $T_0$, the subsequent 14A groups are monitored to detect any 14A group whose second, third and fourth blocks all match with those of the first 14A group. In the case of FIG. 7, when the third 14A group is received, its second, third and fourth blocks match with those of the first 14A group, so that the signal is detected as a PTY burst signal at this point of time.

The number of consecutive coincidences may be set, for example, to two times or more, three times or more, or any other number in the second embodiment, too. The set time $T_0$ can be set to any shorter or longer time.

Figure 8:
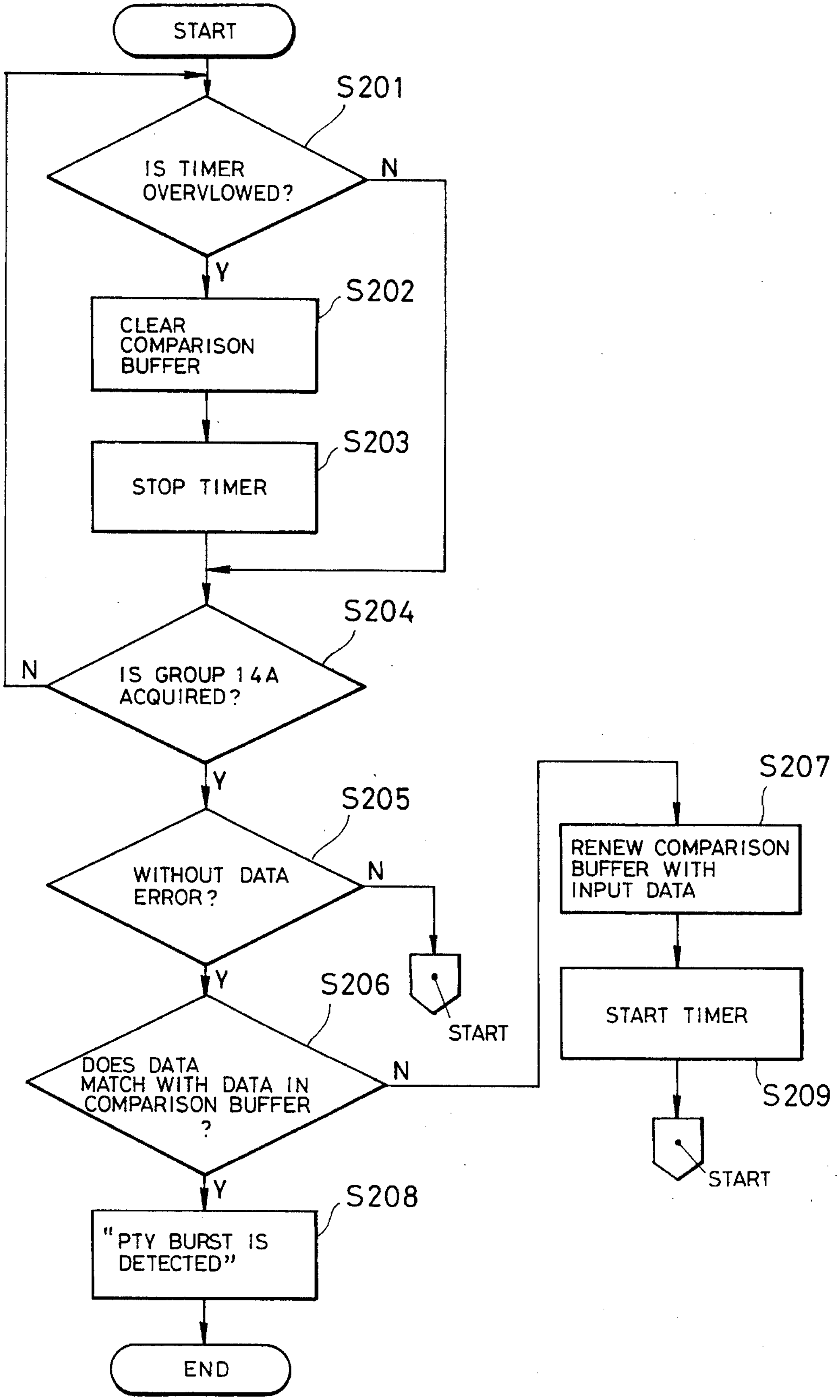
FIG. 8 is a flowchart showing an example of processing steps of the second embodiment of the present invention.

Referring to the flowchart of FIG. 8, the detailed processing operations will be described.

At step S201, the system controller 7 Judges whether or not an overflow of a timer provided in the system controller 7 has occurred. When it is judged in step S201 that an overflow of the timer has occurred, then the comparison buffer is cleared in step S202. As in the case of the first embodiment, the comparison buffer has a storage capacity for storing three blocks of data. After the comparison buffer is cleared in step S202, the system controller stops the timer at step S203.

Figure 5:
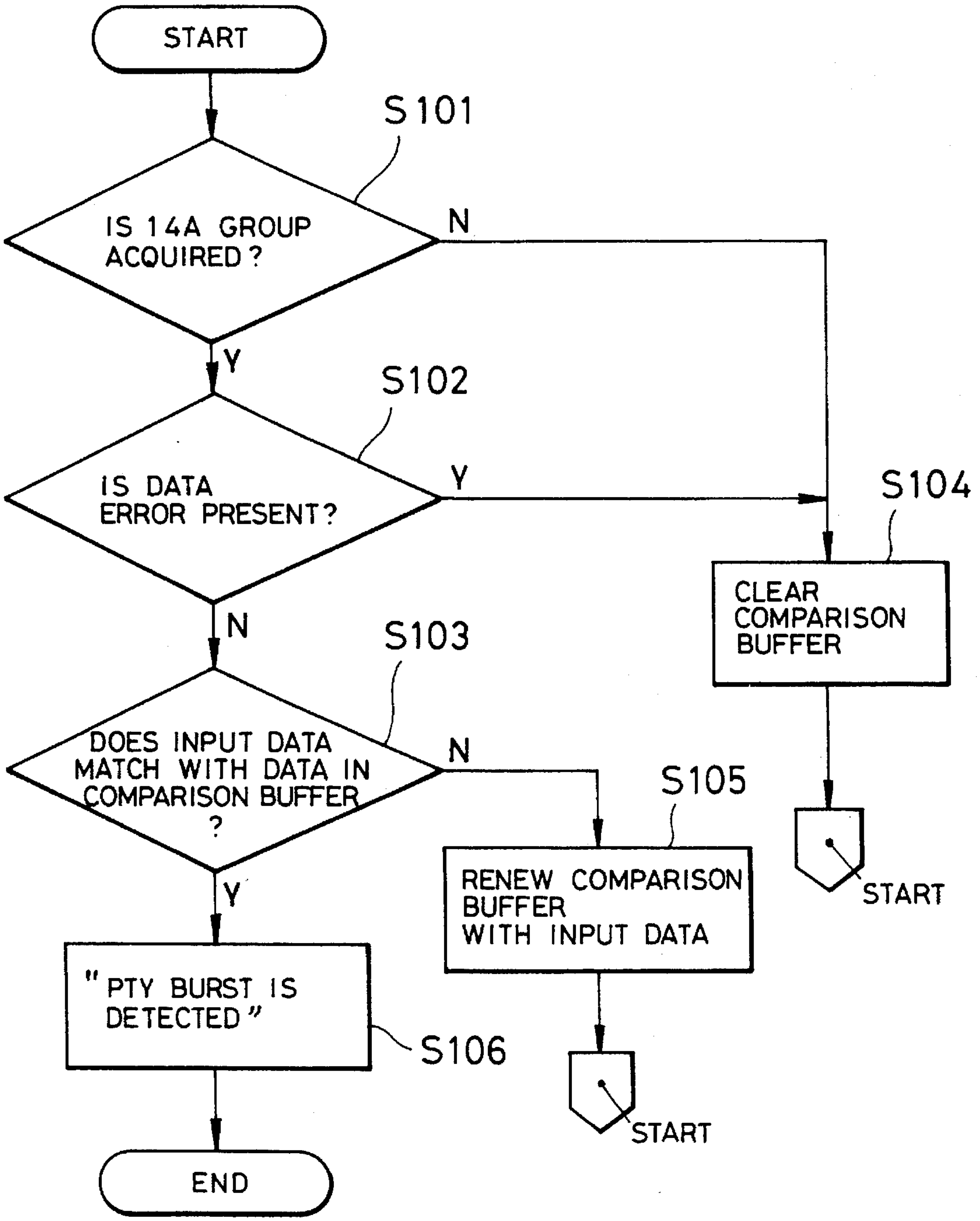
FIG. 5 is a flowchart showing an example of processing steps of the first embodiment of the present invention.
Figure 6:
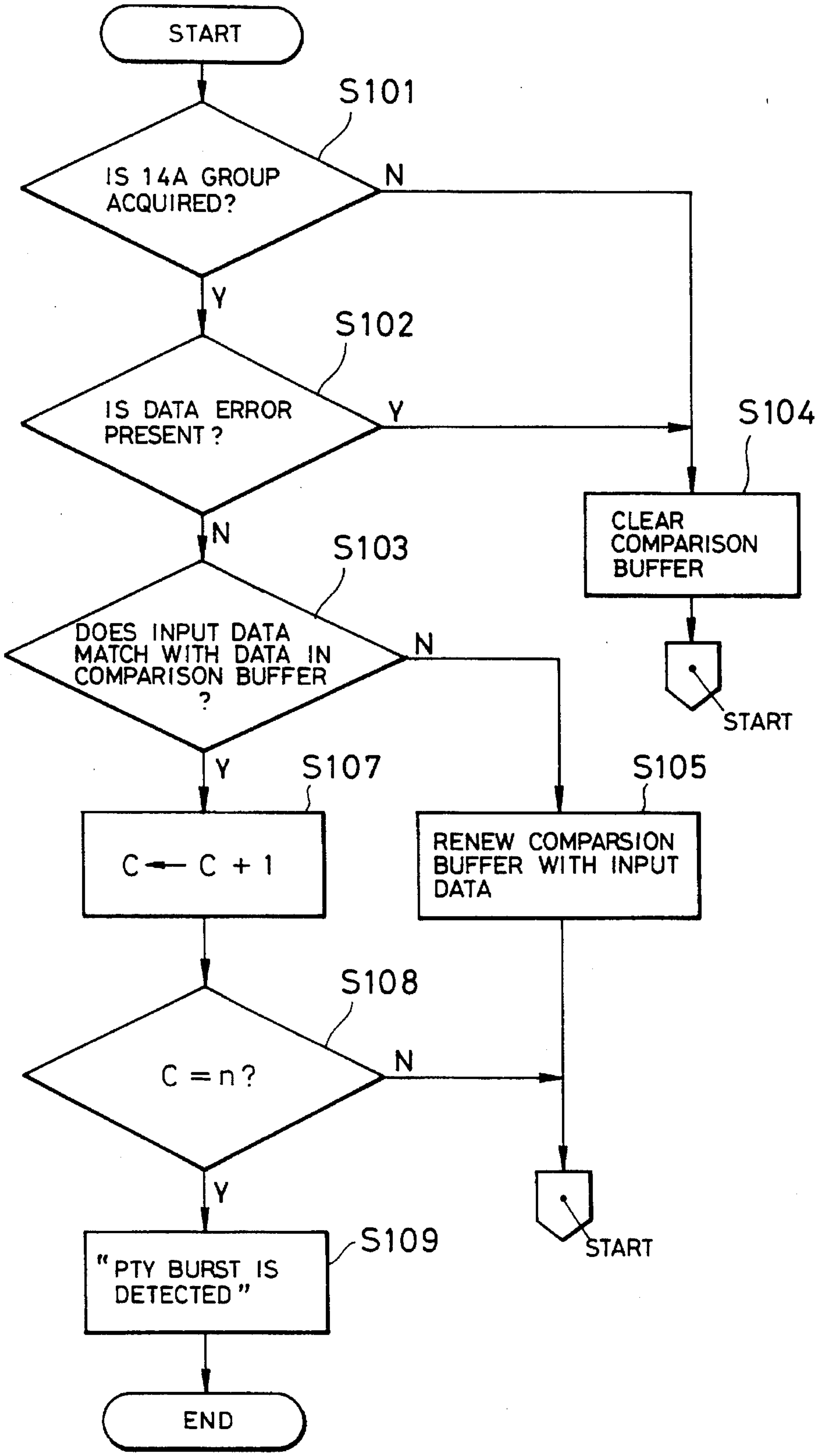
FIG. 6 is a flowchart showing another example of processing steps of the first embodiment.

After the step S203 or when a result of the Judgement at step S201 is that an overflow of the timer has not occurred, the program proceeds to step S204 in which the system controller 7 Judges as to whether or not the data acquired is the data of 14A group (usage 13), as in the step S101 of FIG. 5. Thereafter, the operations of the system controller 7 in steps S205 through S208 are substantially the same as those shown in steps S102 through S104 and S106 of FIG. 5, the explanation of the corresponding steps will not be repeated.

After the contents of the comparison buffer is renewed at step S207, the timer is started at step S209. The operations shown in the flowchart of Jig. 8 will be further explained by way of example shown in FIG. 7. With respect to the first acquired data of FIG. 7, a result of determination at step S201 is that an overflow of the timer has not occurred (the answer is No), and the program proceeds to step S204 to determine whether or not the acquired data is group 14A data. After step S204 the program proceeds to step S205 in which the presence of a data error is detected. Since the first acquired data includes no data error, it is compared with the data stored in the comparison buffer at step S206. In this time, the data are not matched, and the comparison buffer is renewed by the first acquired data at step S207.

Then, the second one of the acquired data shown in FIG. 7 has been extracted in the time period $T_0$, so that the timer overflow is not detected in step S201. Therefore, the program directly proceeds to step S204. Since the second and third blocks of the second acquired data include errors, the answer in step S204 or S205 becomes No, and the program returns to START.

The third acquired data shown in FIG. 7 also is extracted within the time period $T_0$, and the program proceeds through steps S201, S204 and S205. At step S206, the third acquired data is compared with the data stored in the comparison buffer, and the answer of the step S206 becomes Yes in this time. Therefore, in step S208, it is determined that the PTY burst signal has been detected. If the data match has not been Judged within the predetermined time period $T_0$, the detection at step S201 will result in Yes, and the comparison buffer is cleared at step S202. Then the timer is stopped at Step S203 to reset the process.

Figure 9:
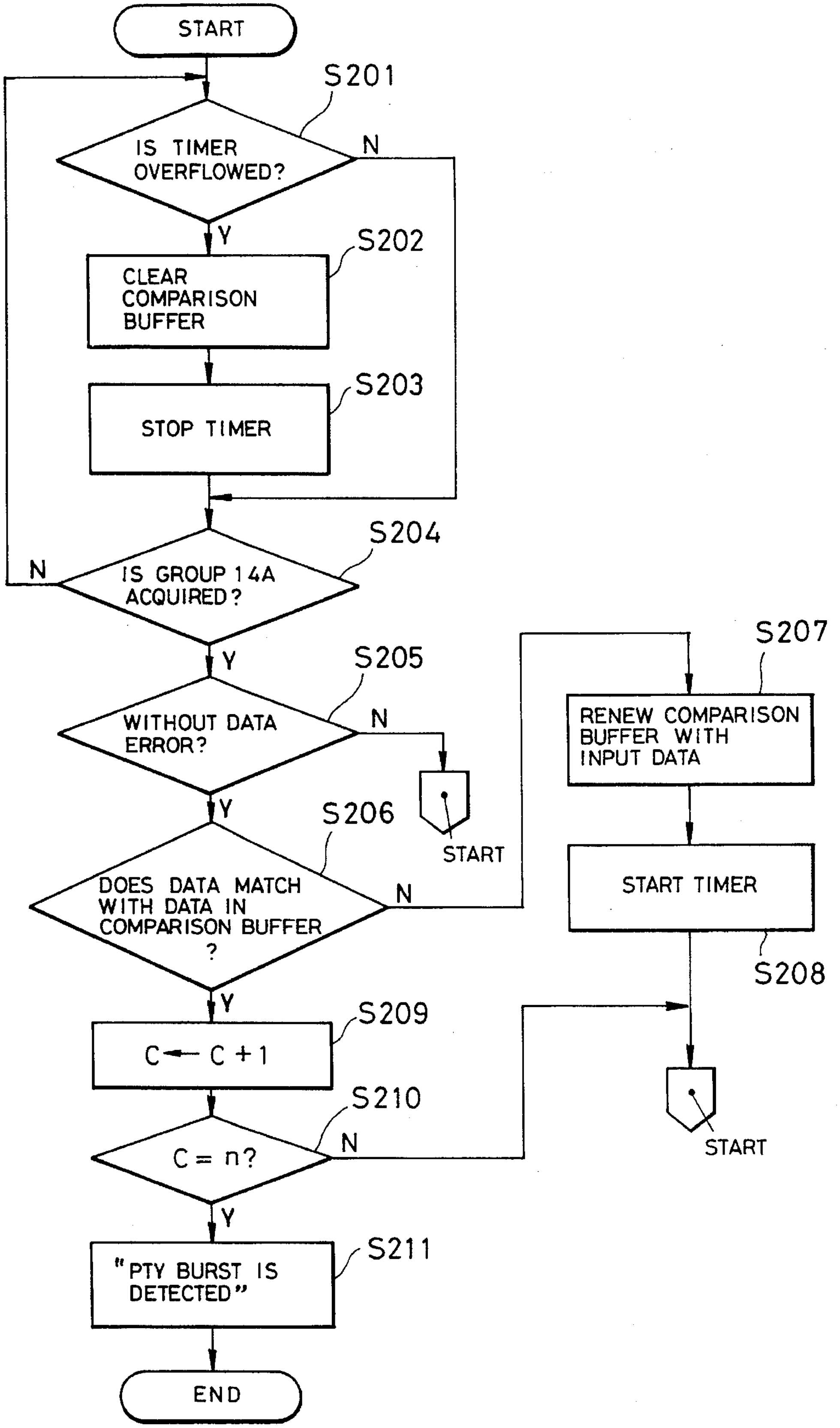
FIG. 9 is a flowchart showing another example of processing steps of the second embodiment.

As in the case of the first embodiment, the processing operations can be modified to detect the data match more than twice, and in such a case steps S209 through S211 which correspond to steps S107 through S109 in FIG.6 are added to the above described process as illustrated in the flowchart of FIG. 9.

Figure 10:
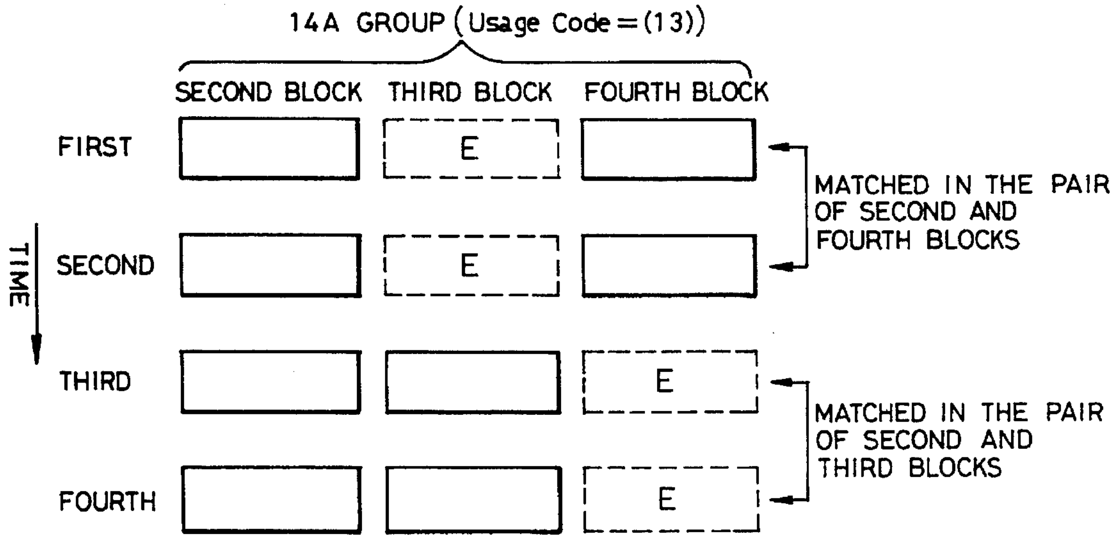
FIG. 10 is a diagram illustrating a detection method according to a third embodiment of this invention.

FIG. 10 shows a detection method according to a third embodiment of this invention. In the third embodiment, the second, third and fourth blocks of a 14A group are separated to a pair of blocks including at least the second block, data comparison is performed pair by pair, and when each block pair of data matches with the associated, compared block pair of data consecutively at least once, the received signal is detected as a PTY burst signal.

In the case of FIG. 10, the second block and the fourth block are previously made a pair, and the second block and the third block are previously made a pair, too, and data comparison is performed pair by pair to detect a coincidence or non-coincidence. In the case of FIG. 10, a pair of the second and fourth blocks in the first 14A group matches with the same pair in the second 14A group, and a pair of the second and third blocks in the third 14A group matches with the same pair in the fourth 14A group, the received signal is detected as a PTY burst signal at the time those two pairs coincide with each other.

The reason why each pair includes the second block is that, unless the group type of the received RDS data is detected to be 14A and the information classification code (Usage Code) is detected to be (13), subsequent data read may differ from one another in type. It is known that RDS data is not only the 14A group, so that it is not possible to find out if the received data is a 14A group unless the second block is detected. Further, even if the received data is the 14A group, it is not possible to detect what the third block is or what the fourth block is, unless the second block is detected.

The number of consecutive coincidences may be set, for example, to two times or more, three times or more, or any other number in the third embodiment, too.

Figure 11A:
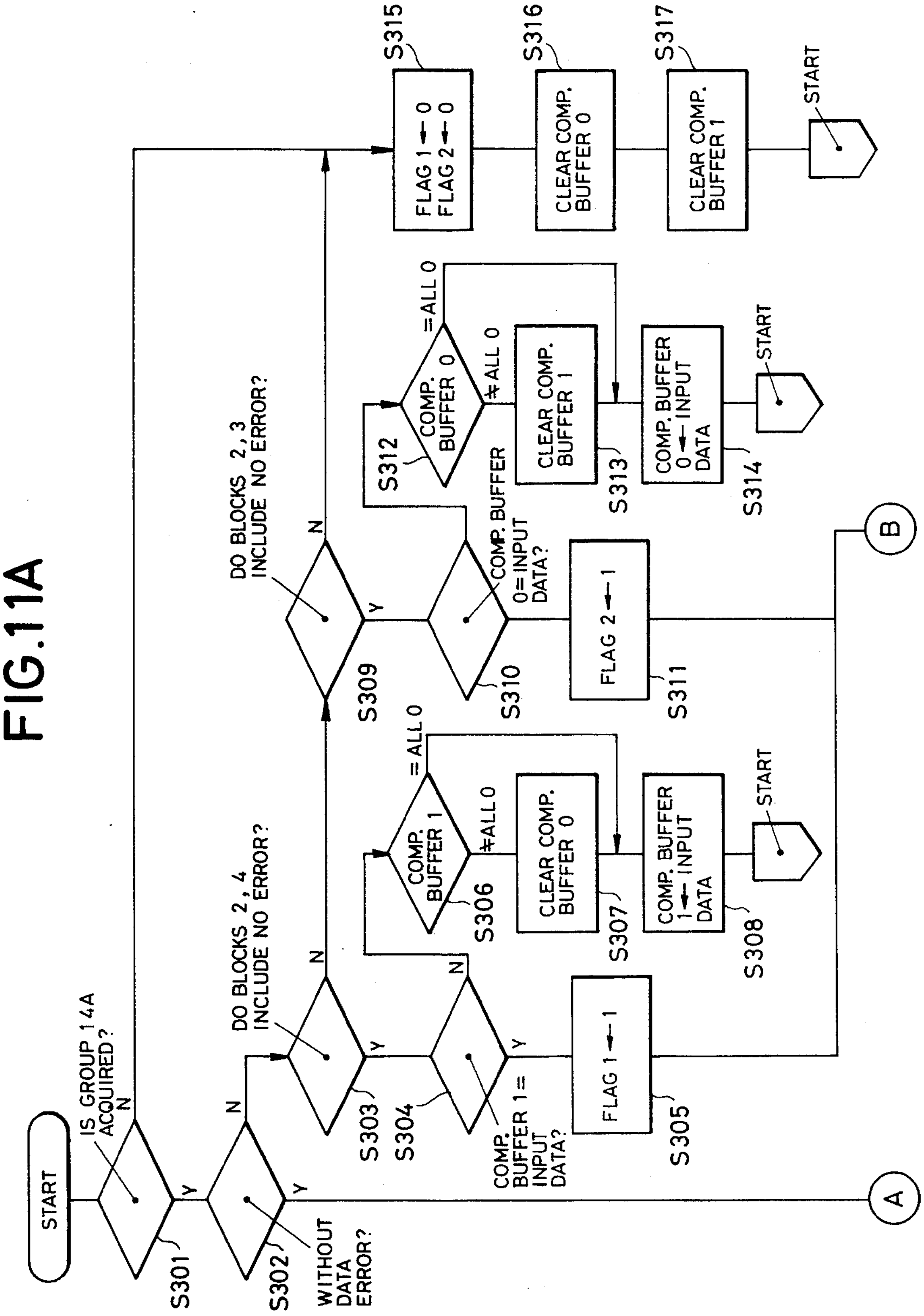
FIGS. 11A and 11B, when combined, are a flowchart showing an example of the processing steps of the third embodiment of the present invention.
Figure 11B:
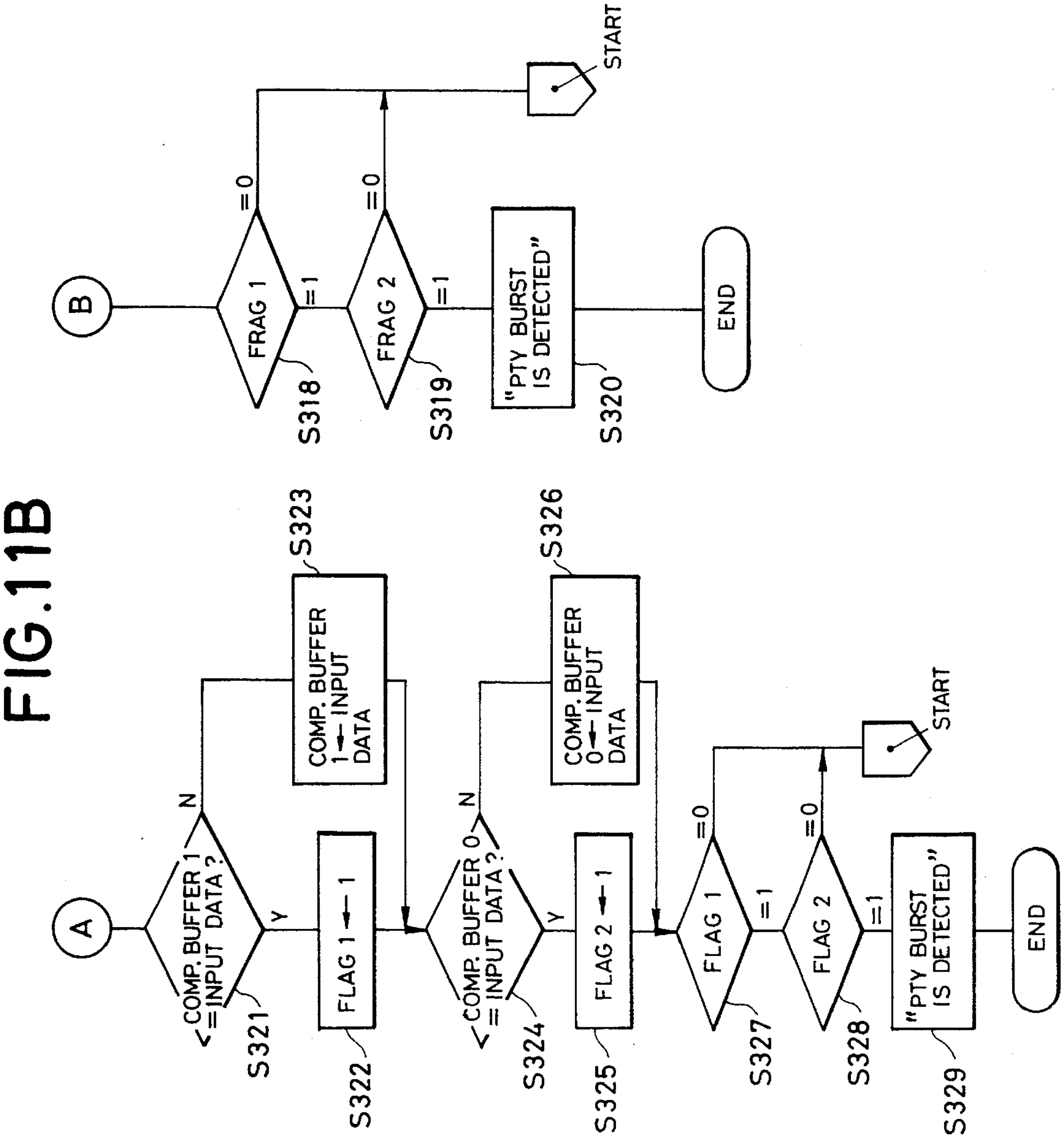

Referring to FIGS. 11A and 11B, an example of the processing operations in the third embodiment will be explained.

In this processing operations, the determination as to whether or not the acquired data is the 14A group is performed at step S301. If the answer is Yes, the program proceeds to step S302 in which whether a data error exists or not is detected. If the answer is No at step S302, the program proceeds to step S303 in which detection is made as to whether or not errors do not exist in both of the second and fourth blocks.

If the answer is Yes at step S303, then the data of the block 2 and 4 are compared with the data in a comparison buffer I at step S304. The comparison buffer 1 is provided for the comparison of data in the blocks 2 and 4 and has a storage capacity for storing data of two blocks. If the data of the blocks 2 and 4 match with the data in the comparison buffer 1, the program proceeds to step S305 in which a flag 1 is set to 1 (the initial value of the flag 1 is 0).

If the data match is not detected at step S304, the program proceeds to step S306 in which presence of data in the first comparison buffer is determined. If the contents of the first comparison buffer is not ALL 0 (ALL 0 indicates a state in which the buffer is cleared), a comparison buffer 0 for the comparison of the second and third data is cleared at step S307 to reset the process, and if ALL 0 is detected no operation is performed. Then the program proceeds to the next step S308 in which the contents of the comparison buffer 1 is renewed by he input data, and program returns to START.

If the result of step S303 is No, the program proceeds to step S309 in which presence of errors in blocks 2 and 3 is detected. After step S309, steps S310 through S314, which corresponds to steps S304 through S308 respectively, are performed. If the answer at step S309 is No, the program proceeds to steps S315 through S317 in which flags 0, 1 are reset to 0, and the comparison buffers 0 and 1 are cleared. After step S305 or S311, the flags 1 and 2 are detected at steps S318 and S319. If both of the flags 1 and 2 are 1, then it is determined at step S320 that the PTY burst has been detected. If either of the flags 1 and 2 is not 1, the program returns to START.

If, on the other hand, the detection at step S302 indicates that no error exists in the data of group 14A, it means that the comparison of the block 2 and 3, and the comparison of the blocks 2 and 4 are possible. In that case, the comparison with the comparison buffer 1 (for the comparison of the blocks 2 and 4) is performed at step S321, and the comparison with the comparison buffer 0 (for the comparison of blocks 2 and 3) is performed at step S324. If the data matches at steps S321 and S324 respectively, flags 1 and 2 are set at steps s322 and S325 respectively. Then the flags 1 and 2 are detected at steps S327 and S328, and it is determined at step S329 that the PTY burst has been detected. If one of the flags 1 and 2 is zero, the program proceeds to START.

In the case of FIG. 10, the first data includes an error in the block 3, therefore, the program proceeds through steps S301, S302, S303 and S304. Since the contents of the comparison buffer 1 is ALL 0 at this state, indicating that the data of the blocks 2 and 4 has been acquired for the first time. Therefore, without clearing the contents of the comparison buffer 0 at step S307, the acquired data is stored in the comparison buffer 1 at step S308. When the second data is acquired, the program proceeds through steps S301 through S304. Since the first data has previously been stored into the comparison buffer 1 at step S308, the answer of the step S304 is Yes in this time, and the flag 1 is set to 1. For the third and fourth data, similar operations are performed with the comparison buffer 0, and the flag 2 is set to 1. Since both of the flags 1 and 2 are 1, the detection of the PTY burst is determined at step S320.

Figure 12:
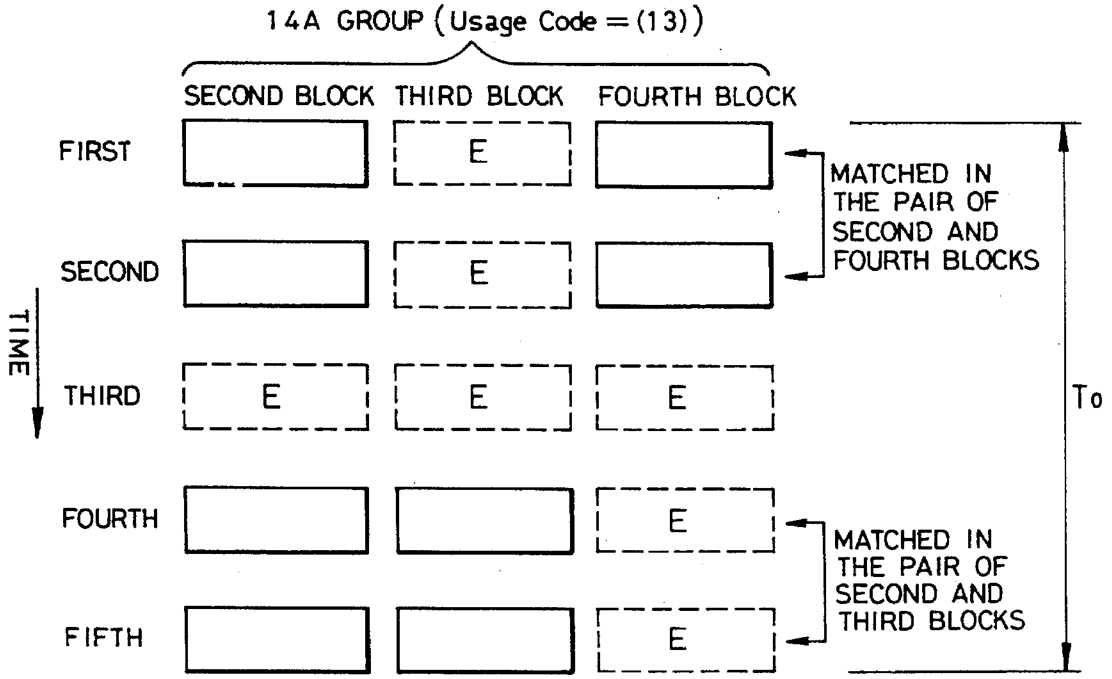
FIG. 12 is a diagram illustrating a detection method according to a fourth embodiment of this invention.

FIG. 12 shows a detection method according to a fourth embodiment of this invention.

In the fourth embodiment, the second, third and fourth blocks of a 14A group are separated to a pair of blocks including at least the second block, data comparison is performed pair by pair, and when each block pair of data matches with the associated, compared block pair of data consecutively at least once within a previously set time $T_0$, the received signal is detected as a PTY burst signal.

In this embodiment, as in the third embodiment, the second block and the fourth block are previously made a pair and the second block and the third block are previously made a pair, too. If a pair of the second and fourth blocks in the first 14A group have been received correctly, then a timer is started from a set time $T_0$ and during the passage of this time $T_0$, it is determined if there is any 14A group whose pair of second and fourth blocks matches with the same pair of the first 14A group. In the case of FIG. 12, a pair of the second and fourth blocks in the first 14A group matches with the same pair in the second 14A group, and a pair of the second and third blocks in the fourth 14A group matches with the same pair in the fifth 14A group, the received signal is detected as a PTY burst signal at this point of time.

The number of consecutive coincidences may be set, for example, to two times or more, three times or more, or any other number in the third embodiment, too. The set time $T_0$ can be set to any shorter or longer time.

Figure 13A:
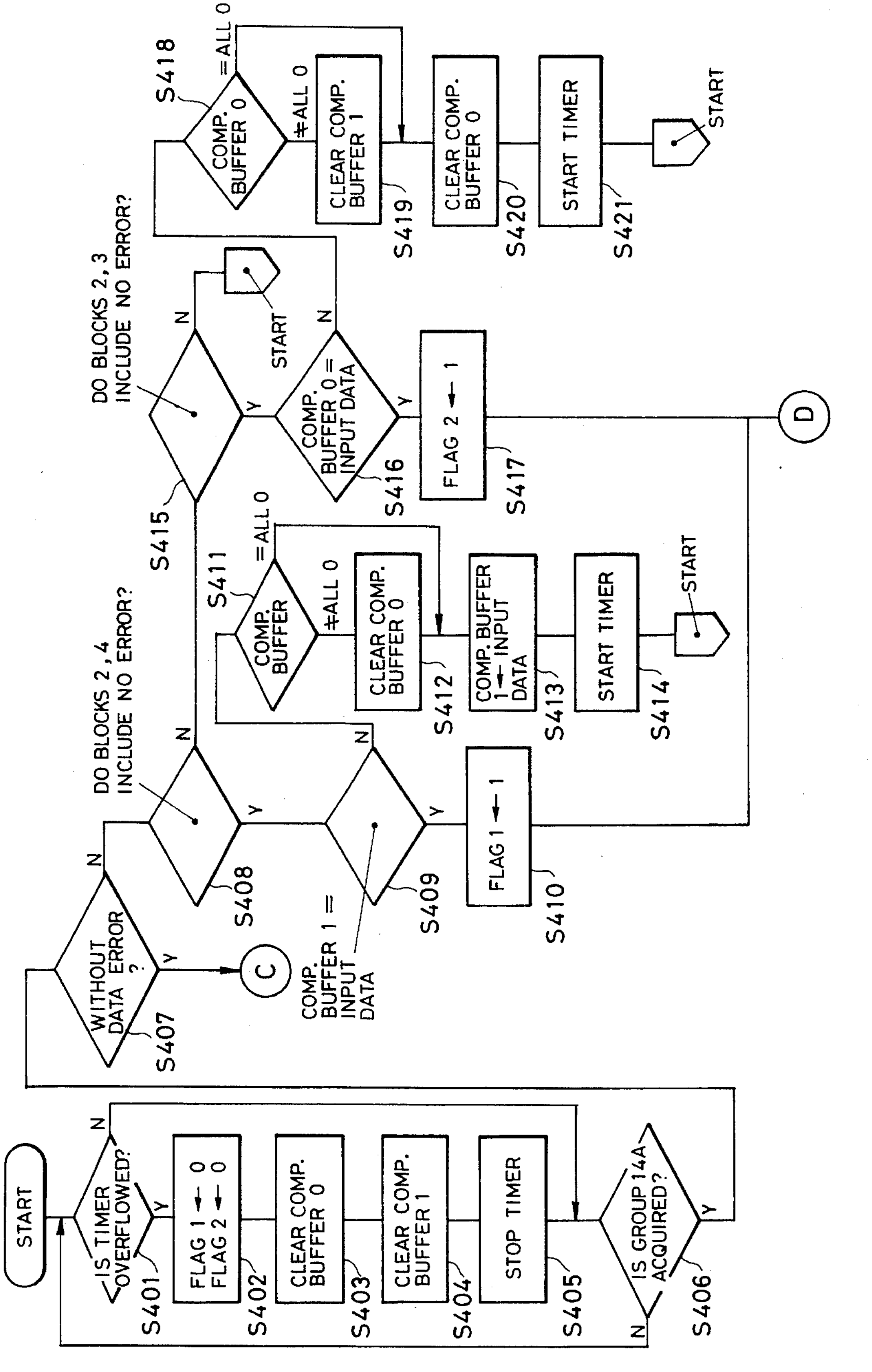
FIGS. 13A and 13B, when combined, are a flowchart showing an example of the processing steps of the third embodiment of the present invention.
Figure 13B:
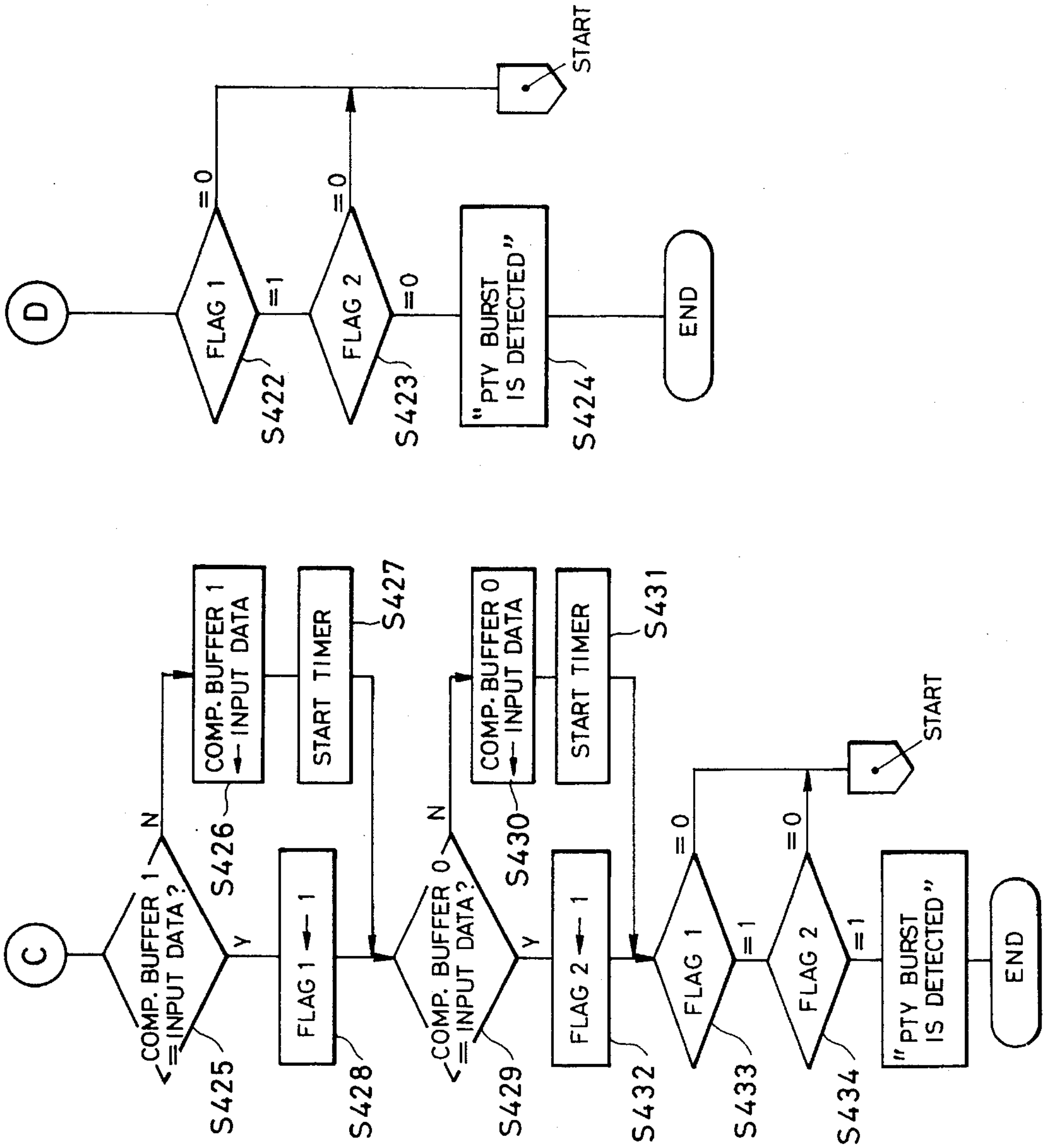

Referring to FIGS. 13A and 13B, an example of the processing operations in the fourth embodiment will be explained.

The processing operations shown in FIGS. 13A and 13B are similar to those shown in FIGS. 11A and 11B, and only the different points will be described.

At step S401, whether or not an overflow of the timer of time $T_0$ has occurred is detected. If the answer of step S401 is Yes, both of flags 1 and 2 are set to 0 at step S402, and the comparison buffers 0 and 1 are cleared at steps S403 and S404. Subsequently, the timer is stopped at step S405 to reset the operation to the initial stage. In the processing steps after the detection of errors in the second and fourth blocks at step S408, the timer is started at step S414 after the input data is stored into the comparison buffer I at step S413. Similarly, in the processing steps after the detection of errors in the second and third blocks at step S415, the timer is started at step S421 after the input data is stored into the comparison buffer 1 at step S420. The step S427, S431 for starting the timer is also provided after the contents of the comparison buffer 1 or the comparison buffer 0 has been renewed at step S426 or S430.

Additionally, a further difference is that the program returns to START when the answer of the step S415 is No. As a result, the resetting process is not performed even if data error exists in both of the blocks 3 and 4.

The processing operations will be as follows with the data shown in FIG. 12.

When the first data is acquired, no data is held in the comparison buffer 1, so that the answer of the step S409 is No. Then the comparison buffer 1 is renewed by the input data at step S413, and the timer is started at S414. When the second data is acquired, the answer of the step S409 is Yes, and the flag 1 is set to 1 at step S410. Since the flag 2 has not been set to 1 at this time, the program proceeds to START to continue the operation.

When the third data is acquired, the answer of the step S406 is No, and the time $T_0$ has not passed, so that the processing operation is continued.

When the fourth data has been acquired, the answer of the step S416 is No, and the data in the comparison buffer 0 is renewed at step S420. When the fifth data has been acquired, the answer of the step S416 is Yes, and the flag 2 is set to 1. Since both of the flags 1 and 2 are set to 1 at this time, the determination is made at step S424 that the PTY burst has been detected.

As previously mentioned, the above described operations are only examples and details of the processing operations in the flowcharts of FIGS. 6, 7, 9, 11A and 11B, 13A and 13B may be arbitrarily altered.

According to this invention, as described above, at the time an arbitrary information program from another network is to be received using EON information, even when the PTY burst signal cannot be received completely, the beginning of the broadcasting of the information program from another network can be detected so that the user can surely listen to this information program from the beginning. This prevents the conventional shortcoming that causes =he user to suffer from listening an information program from a middle.

Since the received signal is detected as the PTY burst signal when each block of data in the 14A group matches with that in the subsequent 14A groups by a predetermined number of times, the time for the detection is shorter than that required by the conventional method of counting the number of 14A groups after every data of the PTY burst signal is received and then determining if the received signal is the PTY burst signal. The detection method of this invention can therefore switch to an information program from another network faster.

Further, even if the PTY burst signal cannot be received completely, an information program can surely be picked up from the beginning of the program. This invention is therefore particularly advantageous when used in an RDS receiver installed on a vehicle, which may not be able to completely receive the PTY burst signal due to the multipath influence depending on the driving environment.

What is claimed is:

1. A Program Type code (PTY) burst signal detection method for use in a Radio Data System (RDS) receiver, said RDS receiver for receiving same enhanced other networks (EON) information that is transmitted from an RDS broadcast station within a short period of time, said same EON information transmitted within a short period of time defining a PTY burst signal indicative of a beginning of an information program broadcast from another network, said EON information being of a group type 14A comprising a plurality of blocks of data, wherein a second one of the blocks of data comprises an information classification code (Usage Code) =(13), said method comprising the steps of:

respectively comparing data blocks in the 14A group with data blocks in an earlier received 14A group, the compared data blocks including at least three of the data blocks in each of the compared 14A groups, wherein the three compared data blocks from each 14A group do not include a first data block of the 14A groups; and detecting a presence of the PTY burst signal when the compared data blocks match by a predetermined number of times.

2. The detection method according to claim 1, wherein the step of comparing is performed by respectively comparing the data blocks in consecutively received 14A groups with the data blocks in the earlier received 14A group, and wherein the PTY burst signal is detected when the data blocks in a predetermined number of the consecutively received 14A groups match the data blocks in the earlier received 14A group.

3. The detection method according to claim 1, wherein the step of comparing is performed by respectively comparing the data blocks in consecutively received 14A groups with the data blocks in the earlier received 14A group, and wherein the PTY burst signal is detected when the data blocks in a predetermined number of the consecutively received 14A groups match the data blocks in the earlier received 14A group within a predetermined time period.

4. A Program Type code (PTY) burst signal detection method for use in a Radio Data System (RDS) receiver, said RDS receiver for receiving same enhanced other networks (EON) information that is transmitted from an RDS broadcast station within a short period of time, said same EON information transmitted within a short period of time defining a PTY burst signal indicative of a beginning of an information program broadcast from another network, said EON information being of a group type 14A comprising a plurality of blocks of data, wherein a second one of the blocks of data comprises an information classification code (Usage Code)=(13), said method comprising the steps of:

separating data blocks in received 14A groups into a first block pair and a second block pair, the first block pair comprising a second and a third block, the second block pair comprising the second block and a fourth block;

comparing the data of the first block pair and the second block pair from one of the received 14A groups to data of a first block pair and a second block pair, respectively, of an earlier received one of the 14A groups; and detecting a PTY burst signal when the compared data consecutively matches a predetermined number of times.

5. The detection method according to claim 4, wherein the step of detecting is performed to detect a PTY burst signal when the compared data matches consecutively by a predetermined number of times within a predetermined time period.

* * * * *